United States Patent [19]

Kadota et al.

[11] 4,078,631

[45] Mar. 14, 1978

[54] APPARATUS FOR CONTROLLING ACCELERATION AND DECELERATION OF MOTOR VEHICLES

[75] Inventors: Masahiro Kadota; Shunji Koganemaru; Chihiro Hayashi, all of Susono, Japan

[73] Assignee: Toyota Jidosha Kogyo Kabushiki Kaisha, Toyota, Japan

[21] Appl. No.: 704,550

[22] Filed: Jul. 12, 1976

[30] Foreign Application Priority Data

Apr. 2, 1976 Japan .................................. 51-36093

[51] Int. Cl.² ........................................... B60K 13/00
[52] U.S. Cl. ................. 180/105 E; 123/102; 123/118
[58] Field of Search ............... 180/105 E, 105 R, 108, 180/109, 110; 123/101, 102, 103 R, 103 D, 118

[56] References Cited

U.S. PATENT DOCUMENTS

| 1,936,993 | 11/1933 | Reed | 180/105 |
|---|---|---|---|
| 2,259,656 | 10/1941 | Neumann | 123/102 |
| 3,715,005 | 2/1973 | Byram et al. | 180/105 E X |

*Primary Examiner*—Joseph F. Peters, Jr.
*Assistant Examiner*—Donn McGiehan
*Attorney, Agent, or Firm*—Stevens, Davis, Miller & Mosher

[57] ABSTRACT

An internal combustion engine fuel saving control system is disclosed in which acceleration of a vehicle is initiated in a region of high engine efficiency, i.e., low fuel consumption, and continues until the actual vehicle speed equals a first preset speed which is greater than the desired traveling speed of the vehicle. When the control system detects that the actual vehicle speed is at the first preset speed, the vehicle engine is stopped (turned off) and the vehicle coasts, thereby producing vehicle deceleration. When the control system further detects that the actual vehicle speed of the coasting vehicle reaches a second preset speed which is less than the desired traveling speed, the vehicle engine is started and acceleration is again initiated. The acceleration-deceleration operation is continuously repeated resulting in an average vehicle speed which equals the desired vehicle traveling speed.

11 Claims, 4 Drawing Figures

APPARATUS FOR CONTROLLING ACCELERATION AND DECELERATION OF MOTOR VEHICLES

BACKGROUND OF THE INVENTION

This invention relates to a control circuit for driving motor vehicles and more particularly to a control circuit for inititating the acceleration and deceleration of motor vehicles when preselected speeds of the vehicle are reached.

In general, internal combustion engines for motor vehicles present a high efficiency when operated at high loads, in other words, the rate of fuel consumption is small, while at low loads they present a decreased efficiency, that is, the rate of fuel consumption is large. Motor vehicles have preset engine outputs and transmission gear ratios so as to meet a wide range of driving conditions such as acceleration and hill-climbing. Therefore, even when driving on a flat road at a constant medium or low speed, the engine is in a light load condition, resulting in a low engine efficiency, i.e. the rate of fuel consumption has been large.

Conventional engines continue rotating even when vehicles are in a hill-descending, coasting or stationary condition, thus consuming a considerable amount of fuel. Also, when a motor vehicle is running on a flat road at a constant speed, but at the ordinary vehicle speed range, that is, below 100 km/h, the engine load is light, particularly at low speeds, so that the engine efficiency is low, resulting in a large rate of fuel consumption.

In an attempt to eliminate the above-mentioned drawbacks, there has been proposed a fuel-saving driving apparatus for internal combustion engines (U.S. Patent application Ser. No. 653,027) which includes a one-way clutch provided before or after the transmission to allow actuation only from the engine side so that, when the rotational frequency on the driven side is higher, only the driven side is kept freely rotatable, and in which there is provided a system to allow the engine to start when the driver steps on an accelerator pedal and to stop when the pedal is released, whereby through pedal operation the engine is intermittently operated in a high load condition which affords a high efficiency. The average engine output is adjusted by changing the ratio of time between operation and stop to thereby save fuel.

When such a fuel-saving driving apparatus for internal combustion engines is used, a motor vehicle is accelerated in the region of high engine efficiency, that is, low fuel consumption rate, to a speed greater than the desired speed. There after, the accelerator pedal is released to stop the engine while the vehicle is allowed to coast to a speed less than the desired speed, where, again, the accelerator pedal is depressed to start the engine and the vehicle is accelerated in the high efficiency region. This operation is continuously repeated so as to give an average speed equivalent to the desired speed, whereby it becomes possible to save fuel.

As is apparent from what has been summarized above, however, in such fuel-saving driving apparatus for internal combustion engines the driver himself compares the vehicle speed with the desired speed at all times and depresses or releases the accelerator pedal accordingly to the control inititation of vehicle acceleration and deceleration. This requires an extra attentiveness of the driver and causes dispersion because the judge is a human being. Thus, the vehicle is not always running in the optimum driving condition when viewed from the standpoint of fuel-saving driving.

SUMMARY OF THE INVENTION

Therefore, it is an object of the present invention to provide an apparatus for controlling the initiation of vehicle acceleration and deceleration to achieve an automatic vehicle acceleration and deceleration between preset upper-limit and lower-limit vehicle speeds.

Another object of the invention is to provide an apparatus for controlling the initiation of acceleration and deceleration of the motor vehicle in which the engine is in no danger of overrunning when the transmission is in neutral or low-speed position or the clutch is disconnected.

Yet another object of the invention is to provide an apparatus for controlling the initiation of acceleration and deceleration of the motor vehicle with which a driver may control a throttle valve through an accelerator pedal when he wishes to control initiation of acceleration or discontinue coasting in an urgent need.

Another object of the invention is to provide an apparatus for controlling the initiation of acceleration and deceleration of the motor vehicle with which a driver may set upper-limit and lower-limit vehicle speeds.

According to the present invention, the above-mentioned object is attained by an appartus for controlling the initiation of acceleration and deceleration of motor vehicles, which apparatus comprises an acceleration/deceleration initiation control circuit adapted to compare a vehicle speed voltage from a vehicle speed sensor with a preset upper-limit vehicle speed voltage and a preset lower-limit vehicle speed voltage and to emit with hysteresis an "off" signal in response to a vehicle speed voltage greater than the preset upper-limit vehicle speed voltage and an "on" signal in response to a vehicle speed voltage less than the preset lower-limit vehicle speed voltage, an electromagnetic relay connected to said acceleration/deceleration initiation control circuit and adapted to supply an electric current from a battery to an ignition circuit in response to the "on" signal and to cut off the current in response to the "off" signal, and a throttle control device connected to said electromagnetic relay and adapted to open a throttle valve in response to the "on" signal.

That is, the apparatus for controlling acceleration and deceleration of motor vehicles according to the present invention has an acceleration/deceleration initiation control circuit adapted to turn off when the vehicle speed voltage has become greater than the preset upper-limit vehicle speed voltage and to turn on when the vehicle speed voltage has become less than the preset lower-limit vehicle speed voltage, and in response to its "on" signal the starter, the ignition circuit and the throttle control device are energized to start operation of the engine and thus the vehicle is accelerated. On the other hand, in response to an "off" signal from the acceleration/deceleration initiation control circuit, the engine is stopped (turned off), allowing the vehicle to coast. Thus, acceleration/deceleration driving is effected automatically between the preset upper and lower vehicle speed limits, thereby minimizing the rate of fuel consumption.

Other and further objects, features and advantages of the invention will appear more fully from the following description.

DETAILED DESCRIPTION OF THE INVENTION

Reference is made below to the accompanying drawings for a full illustration of embodiments of the present invention.

Figure 1:
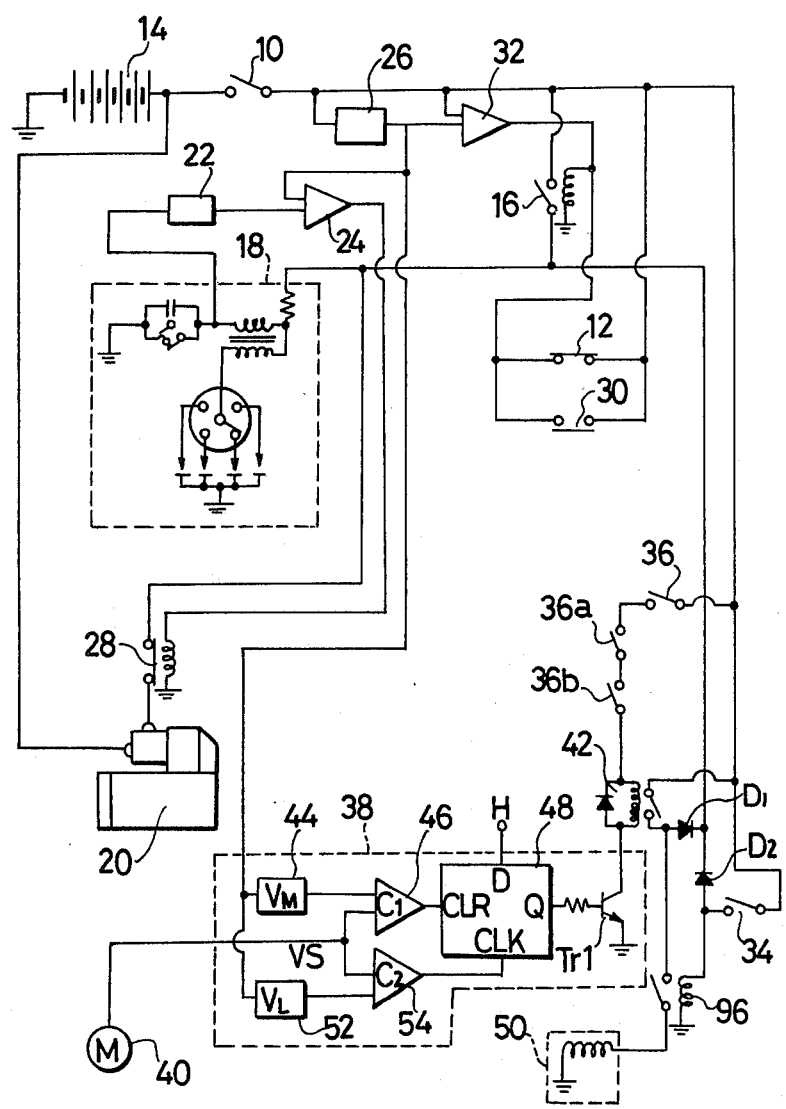
FIG. 1 is a circuit diagram illustrating an embodiment of the apparatus for controlling the initiation of acceleration and deceleration of motor vehicles according to the present invention.

FIG. 1 is an electric circuit diagram illustrating an embodiment of the apparatus for controlling the initiation of acceleration and deceleration of motor vehicles according to the present invention. When a main switch 10 is closed, a water temperature sensor 12 mounted in the cooling system is kept closed when the temperature of the cooling water for cooling the engine (not shown) is low and so current flows from battery 14 to the solenoid of an electromagnetic relay 16, thus causing its contact to be closed. As a result, current from the battery 14 flows through an ignition circuit 18 and a starter 20 and the engine starts. Upon starting of the engine, an ignition pulse is converted into an analogue signal proportional to the rotational frequency of the engine by means of a DA converter 22 and is fed to one input of a comparator 24. The comparator 24 compares such analogue signal with the set voltage fed to the other input from a voltage regulator circuit 26 and, when the rotational frequency of the engine exceeds the set value, in other words, when the engine starts, it produces an output to actuate the solenoid of an electromagnetic relay 28. As a result, the contact of the relay 28 opens, the starter 20 stops and only the engine continues warming up.

Even if the warming-up causes the temperature of the cooling water to rise and the water temperature sensor 12 to open, if the negative pressure of a brake booster (not shown) is low, a pressure sensor 30 in communication therewith is kept closed and current flows therethrough into the ignition circuit 18 and the engine continues rotating. Even if the negative pressure in the brake booster becomes high and causes the pressure sensor to open, if the voltage of the battery 14 is lower than the set voltage from the voltage regulator circuit 26, the comparator produces an output to excite the solenoid of the electromagnetic relay 16, thus causing its contact to be closed and the engine continues rotating, thereby charging the battery 14.

Assuming that the temperature of the cooling water, the negative pressure in the brake booster and the battery voltage are all high, the electromagnetic relay 16 for shorting the acceleration/deceleration initiation control circuit is opened and the engine stops, but when an accelerator pedal (not shown) is depressed, a switch 34 in interlocking relation therewith turns on and current flows through the ignition circuit 18 and starter 20, so that, as set forth above, the engine again starts and continues producing output and the vehicle velocity on driving becomes high. When the switch 34 turns on, a diode D1 is connected in the direction shown so as to block current flow towards throttle control means as will be described later. If the vehicle velocity exceeds the desired velocity and deceleration is desired, the accelerator pedal is released to turn the switch 34 off and the ignition circuit 18 also turns off, thus causing the engine to stop, but the vehicle coasts by virtue of a one-way clutch (not shown). If the vehicle velocity becomes lower than the desired velocity and acceleration is desired, the accelerator pedal is depressed to turn the switch 34 on and the ignition circuit 18 and the starter 20 again start operation, which causes the engine to start. When a change-over switch 36 is off, acceleration and coasting driving (with the averaged speed made as the desired speed) are repeated in such a way by the driver whereby it is possible to effect driving with minimized rate of fuel consumption.

When the change-over switch 36 is turned on and when the transmission is not in neutral or low-speed position and the clutch is connected, switches 36a and 36b are on, so that the acceleration/deceleration initiation control circuit 38 operates with current fed from the battery and turns on or off according to the vehicle speed voltage from a vehicle speed sensor 40 such as a d.c. motor, thus causing an electromagnetic relay 42 to turn on or off. That is, when at the time of acceleration a comparator 46 judges that the vehicle speed voltage VS is lower than the set voltage VH from an upper-limit vehicle speed setting means 44, the comparator 46 issues a 1 (high) signal. On the other hand, when VS is lower than the set voltage VL from a lower-limit vehicle speed setting means 52, a comparator 54 issues a 1 (high) signal and a D type flip-flop 48 puts out a 1 to cause a transistor Tr1 to turn on, so that the contact of the electromagnetic relay 42 closes, causing current flow through the ignition circuit 18, and the engine does not stop. When the electromagnetic relay 42 is closed and if at this moment the accelerator pedal is depressed and the switch 34 closed, an electromagnetic relay 96 turns on, resulting in a current flow through the solenoid of a solenoid valve 50 and a throttle valve (not shown) is opened as will be described later. When the relay 42 is on, a diode D2 is connected in the direction shown to block current flow through the relay 96. When as a result of acceleration the vehicle speed exceeds the lower-limit speed, the vehicle speed voltage VS becomes larger than the set voltage VL and the comparator provides a 0 (low) signal, but the D type flip-flop 48 still puts out a 1 and gives no change to Tr1, etc. When a further acceleration causes the vehicle speed to exceed the upper-limit velocity, the vehicle speed voltage VS becomes larger than the set voltage VH, the comparator 46 issues a 0 (low) signal, the D type flip-flop 48 puts out a 0 and the transistor Tr1 turns off, so that the contact of the relay 42 opens and the ignition circuit 18 turns off, thus causing the engine to stop and the vehicle start coasting.

When at the time of deceleration the vehicle speed becomes less than the upper-limit vehicle speed, the vehicle speed voltage VS becomes less than the set voltage VH and the comparator 46 produces a 1 (high) signal, but the D type flip-flop still puts out a 0 and gives no change to the transistor TR1, etc. If a further deceleration causes the vehicle speed voltage VS to be lowered below the comparison voltage VL from the lower-limit vehicle speed setting means 52, the comparator 54 produces a 1 (high) signal and the D type flip-flop puts out a 1 to cause the transistor Tr1 to turn on and current flows through the ignition circuit 18, whereupon the solenoid valve is turned on to open the throttle valve. When the vehicle is accelerated resulting in the vehicle speed voltage VS becoming higher than the upper-limit set voltage VH, the solenoid valve 50 is turned off and the vehicle again starts coasting as set forth above. Thus the vehicle is automatically accelerated and decelerated between the preset upper-limit and lower-limit vehicle speeds, so that the vehicle is kept in an optimum driving condition in point of the rate of fuel consumption without requiring an extra attentiveness of the driver. In this case, if the acceleration/deceleration initiation control circuit 38 is actuated when the transmission is in neutral or lowspeed position and the clutch disconnected, the engine may undergo overrevolution. To prevent this, a transmission switch 36a and a clutch switch 36b are provided, whereby when in such a driving condition at least one of the switches 36a and 36b is turned off to render the acceleration/deceleration initiation control circuit 38 inoperative.

Figure 2:
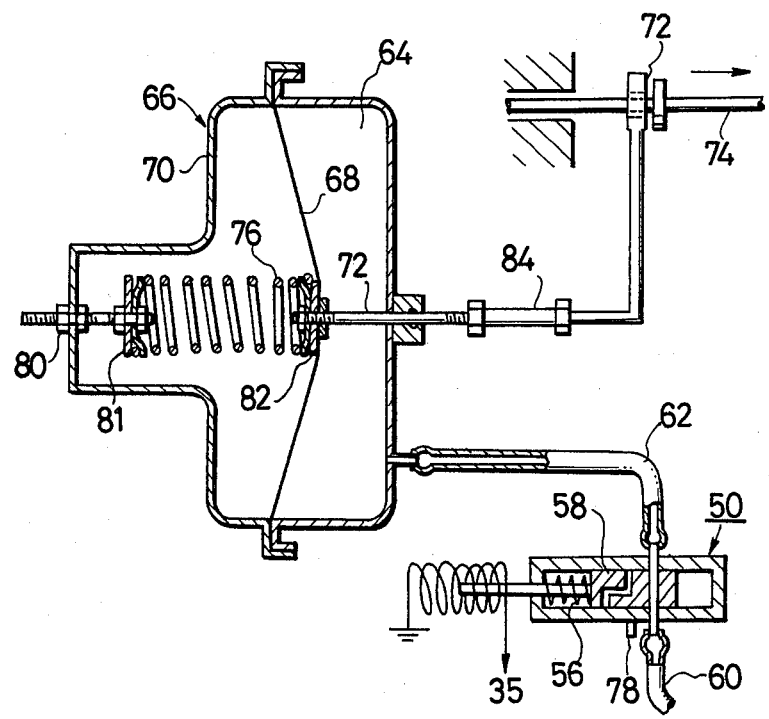
FIG. 2 is a sectional side elevation illustrating an embodiment of the throttle control means used in FIG. 1.
Figure 3:
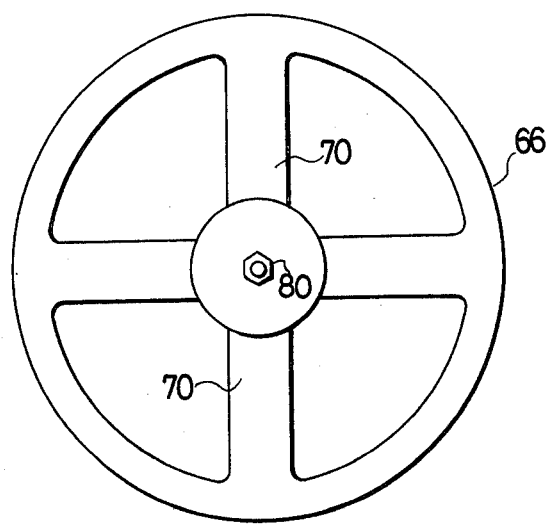
FIG. 3 is a front view of the throttle control means of FIG. 2.

FIG. 2 is a sectional side elevation illustrating an embodiment of the throttle control means used together with the apparatus of FIG. 1, and FIG. 3 is a front view thereof. These figures show the state of the solenoid valve 50 being on. When the solenoid of the solenoid valve 50 is excited as mentioned above, a plunger 58 is moved to the left as shown against the compressive force of a return spring 56, so that the negative pressure or vacuum from an intake manifold (not shown) passes through a pipe 60 and then an opening at the right side in the plunger 58 and so through a pipe 62 into a negative pressure or vaccum chamber 64. A casing 66, which is located at the side opposite to the nagative pressure chamber 64 relative to a diaphragm 68, is in a largely bored shape leaving an arm 70 as shown in FIG. 3; therefore, the diaphragm 68 is moved to the right due to the differential pressure between the atmospheric pressure and the negative pressure. As a result, an arm 72, which is attached to the diaphragm 68, pushes a throttle linkage 74, which causes a throttle valve (not shown) connected thereto to open. When the throttle valve is opened, the negative pressure in the negative pressure chamber 64 is decreased, so that the throttle valve is slightly closed. In this way, the throttle valve is held at a degree of opening at which the differential pressure between the atmospheric pressure and the negative pressure and the restoring force of the return spring 76 balance, and the vehicle is accelerated.

When the vehicle speed exceeds the upper-limit value, the contact of the electromagnetic relay 42 opens and the solenoid of the solenoid valve 50 is de-energized, so that the plunger 58 is moved to the right by means of the return spring 56 whereby the negative pressure chamber 64 is brought into communication with the atmosphere through the pipe 62, a through hole at the left side in the plunger 58 and a port 78 which communicates with the atmosphere. As a result, the diaphragm 68 is moved to the left by means of the return spring 76 and so the arm 72 is also moved to the left, which causes the throttle valve to close. At the same time, as hereinbefore described, the ignition circuit 18 turns off and the engine stops, and thus the vehicle starts coasting. When as a result of the coasting the vehicle speed goes below the lower-limit value, the ignition circuit 18 again turns on, so that the throttle valve is opened and the vehicle accelerated as mentioned above. Thus the vehicle is automatically controlled in terms of the initiation of its acceleration and deceleration so that it is kept in an optimum driving condition with respect to the rate of fuel consumption.

Adjusting means 80, which is attached to the extended part of a case 66 and which is composed of, for example, bolt and nut, adjusts the resorting force of the return spring 76 to thereby adjust the throttle opening. The return spring 76 is anchored to fixed members 81 and 82 so that it may operate by both compression and tension. A length adjusting part 84, which is mounted at an intermediate portion of the arm 72, adjusts the relative positional relation between the arm 72 and the linkage 74.

Figure 4:
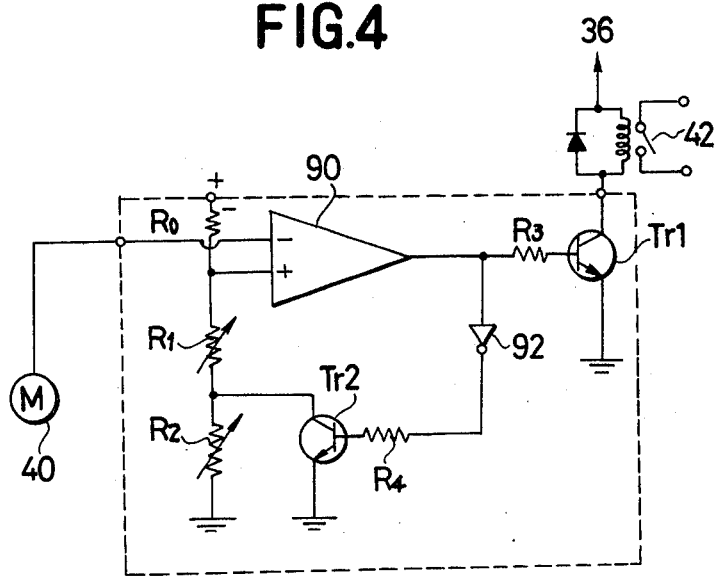
FIG. 4 is a circuit diagram illustrating another embodiment of the acceleration/deceleration initiation circuit used in the apparatus for controlling the initiation of acceleration and deceleration of motor vehicles according to the present invention.

FIG. 4 is a circuit diagram illustrating another embodiment of the acceleration/deceleration initiation control circuit used in the apparatus for controlling acceleration and deceleration of motor vehicles according to the present invention. When the vehicle stops, a zero voltage level is fed to the minus input of the comparator 90 so that the comparator 90 puts out a 1 signal. As a result, the transistor Tr1 turns on and the relay 42 also turns on to close its contact, so that the solenoid valve 50 turns on and the throttle valve is opened and thus the vehicle is accelerated. Since the 1 output of the comparator 90 is reduced to a 0 by means of an inverter 92, the transistor Tr2 turns off and the set voltage at the comparative input terminal of the comparator 90 becomes a voltage VH which is determined by resistors R0, R1 and R2.

When the vehicle is accelerated, gaining in speed and the vehicle speed voltage VS exceeds the set voltage VH, the output of the comparator 90 reverses into a 0 state. Consequently, the transistor Tr1 turns off and the relay 42 also turns off, so that the ignition circuit 18 turns off and stops the engine whereupon the throttle valve is closed. When the comparator 90 puts out a 0, the output of the inverter 92 becomes a 1 and the transistor Tr2 turns on, so that the voltage at the comparative input terminal of comparator 90 lowers to the set voltage VL which is determined by only the resistors R0 and R1.

When as a result of the coasting the vehicle speed voltage VS lowers below the set voltage VL, the comparator 90 again reverses, the relay 42 operates and the vehicle begins accelerating again whereupon the voltage at the comparative input terminal of comparator 90 again rises to toward the set voltage VH. In this way, the acceleration and deceleration points for a vehicle are automatically controlled.

With the acceleration/deceleration initiation control circuit according to the present invention, as set forth hereinbefore, if the changeover switch 36 is kept on, the starting and stopping of the engine and also the control of the throttle valve can automatically be performed to accomplish an acceleration/deceleration driving. When the driver is confronted with an urgent case in which he wishes to control acceleration or discontinue coasting, he may release the accelerator pedal whereby the relay 96 turns off and consequently the solenoid 50 also turns off and the arm 72 reverts to the original position, thus allowing the throttle valve to be free. Depressing the accelerator pedal turns the ignition circuit 18 on and the starter 20 also turns on, so that if the vehicle is coasting the engine starts and assumes the same state as ordinary vehicles, that is, the state without the present apparatus. Since the acceleration/deceleration control circuit can set the upper-limit vehicle speed and the lower-limit vehicle speed for acceleration/deceleration driving independently, a driving method can be set according to traffic condition. But when traffic is not heavy, lowering the lower-limit vehicle speed as far as possible would contribute to a smaller rate of fuel consumption.

What is claimed is:

1. Apparatus for controlling the initiation of acceleration and deceleration of motor vehicles, said apparatus comprising:

an acceleration and deceleration initiation control circuit adapted to compare a vehicle speed voltage from a vehicle speed sensor with a preset upper-limit vehicle speed voltage and a preset lower-limit vehicle speed voltage and to put out with hysteresis an "off" signal in response to a vehicle speed voltage greater than the preset upper-limit vehicle speed voltage and an "on" signal in response to a vehicle speed voltage less than the preset lower-limit vehicle speed voltage, an electromagnetic relay connected to said acceleration and deceleration initiation control circuit and adapted to supply an electric current from a battery to an ignition circuit in response to the "on" signal and to cut off the current in response to the "off" signal, and a throttle control device connected to said electromagnetic relay and adapted to open a throttle valve in response to the "on" signal.

2. Apparatus as claimed in claim 1 further comprising a transmission switch connected in series with said electromagnetic relay and turned on when the transmission is not in neutral or low-speed position.

3. Apparatus as claimed in claim 1 further comprising a clutch switch connected in series with said electromagnetic relay and turned on when the clutch is connected.

4. Apparatus as claimed in claim 1 further comprising a starter circuit connected to said electromagnetic relay for starting an engine in response to an "on" signal.

5. Apparatus as claimed in claim 1 wherein said acceleration and deceleration initiation control circuit includes means for setting upper-limit and lower-limit vehicle speeds.

6. Apparatus as claimed in claim 5 wherein said acceleration and deceleration initiation control circuit includes a D type flip-flop circuit.

7. Apparatus as claimed in claim 5 wherein said acceleration and deceleration initiation control circuit includes an inverter circuit.

8. Apparatus as claimed in claim 1 wherein said throttle control device includes a diaphragm device.

9. Apparatus as claimed in claim 8 wherein said diaphragm device includes means for attaching a return spring to the diaphragm of said diaphragm device.

10. Apparatus as claimed in claim 8 wherein said throttle control device includes means for adjusting the restoring force of said return spring to provide a regulated throttle opening.

11. Apparatus as claimed in claim 8 wherein said throttle control device includes means for adjusting the length of the linkage mechanism provided between said diaphragm and the throttle valve.

* * * * *